Figure 1:
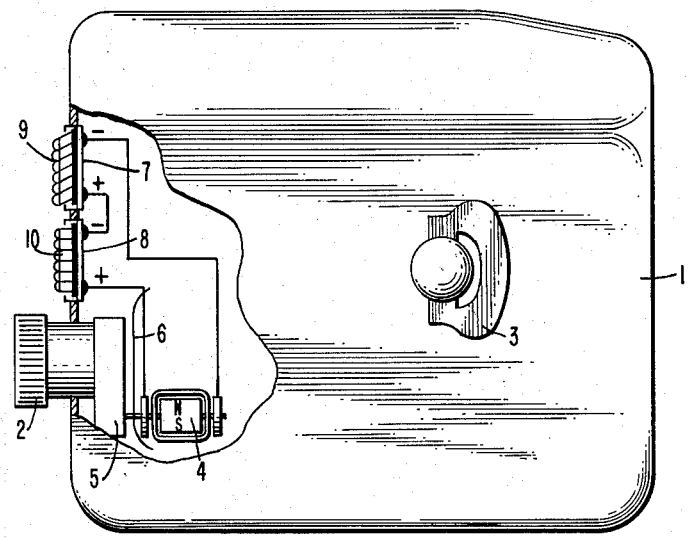

Oct. 22, 1963  F. FALKENBURG  3,107,594
PHOTOELECTRIC EXPOSURE CONTROL
Filed March 12, 1959

INVENTOR:
FRITZ FALKENBURG

BY  Nolte & Nolte

ATTORNEYS

United States Patent Office 3,107,594
Patented Oct. 22, 1963

3,107,594
PHOTOELECTRIC EXPOSURE CONTROL
Fritz Falkenburg, Erlangen, Bavaria, Germany, assignor to P. Gossen & Co. G.m.b.H., Erlangen, Bavaria, Germany
Filed Mar. 12, 1959, Ser. No. 798,945
Claims priority, application Germany Mar. 14, 1958
3 Claims. (Cl. 95—64)

When measuring reflected light, photoelectric exposure meters are used to measure the average brightness, which consists of individually different brightnesses in the subject within the acceptance angle, whereas it is the brightness of the most important part of the subject which should be measured. Nevertheless, with this measuring method satisfactory results can be obtained, when the difference in brightness at various parts of the subject is not too great. But when a great difference exists, for instance when taking photographs in the open air, where the bright sky often constitutes a considerable part of the subject, while being of no importance with regard to the exposure, a correction can be made when using hand exposure meters by taking a separate measurement at another important but darker part of the subject. It is also possible to eliminate the disturbing influence of the very bright parts of the subject by holding the exposure meter in a slanting position towards the ground.

These possibilities do, however, not exist, when the exposure meter is incorporated in a camera and serves as an automatic exposure control, because, on account of the necessary coupling of the exposure measurement or exposure control with the shooting process of the camera, only the average brightness of the subject will be accounted for. Especially when tracing moving subjects in the open air with automatically controlled movie cameras, it cannot be avoided that the darker parts are underexposed as a result of the action of the automatic exposure control, if an increasing part of the light acceptance angle is taken up by the bright sky.

To eliminate these sources of possible errors, it has already been suggested to use a second cell besides the main photovoltaic cell, on which only the light from the bright part of the subject impinges, and whose polarity is of opposite direction to that of the first photo cell. The countercurrent of the second cell will correct the photoelectric current of the main cell, the correction being dependent on the intensity of the brightness of the sky.

Such an arrangement will only work successfully when the difference in intensity between the bright and the dark parts is relatively small. If the influence of the second cell is so great that even medium intensities of the bright part of the subject produce a considerable current in the opposite direction, high intensities on the second cell will cause the opposing photoelectric current of the second cell to prevail. Consequently the diaphragm will remain in the widely open position causing a completely incorrect measurement and thus also an incorrect exposure. If on the other hand, the influence of the second cell is kept smaller in order to avoid the above mentioned error, the correction will be wholly insufficient when contrasts are only slight.

The invention described in detail below refers, however, to an exposure control arrangement with two selenium photocells whose polarities are not opposed as in previous known arrangements, but connected in series with a moving coil, and are provided with acceptance angle limiting devices which are directed to opposite sides.

Figure 2:
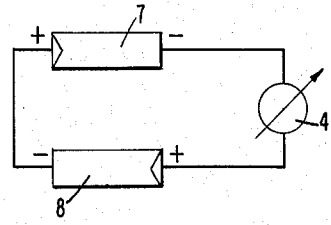
Figure 3:
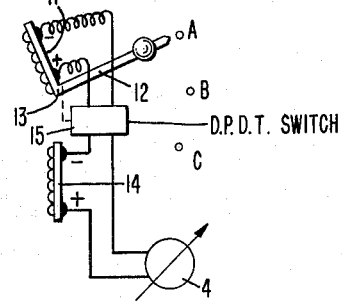

The invention will be understood fully from the following description and the drawing wherein:

FIG. 1 shows one embodiment of the invention;
FIG. 2 is a circuit diagram of the apparatus of FIG. 1; and
FIG. 3 is a circuit diagram of another embodiment of the invention.

A movie camera 1 of conventional design with the lens 2 and the knob 3 for winding the spring has in its interior, besides the other usual elements of the camera not shown here, a moving coil instrument 4 which operates a diaphragm control 5 placed between the lens 2 and the film plate 6. This diaphragm control is of known design and not an object of this invention.

On the side of the camera turned towards the subject there are two selenium photocells 7 and 8 which are provided with the usual acceptance angle limiting devices 9 and 10. The acceptance angle limiting device 9 is designed in such a way as to ensure that the photo cell 7 will obtain light only from the lower and consequently often considerably darker parts of the image, whereas the photocell 8 is illuminated from the total picture angle, so that it will pick up a large part of the brightness of the sky in case of outdoor shots. As can be seen from the polarity symbols and the circuit diagram as per FIGURE 2, both photocells are connected with the same polarity in series with the moving coil instrument 4.

This arrangement operates as follows:

On account of the influence of the sky and its high intensity the photocell 8 produces a current which is above all influenced by this bright part of the subject; the current produced is thus much higher than the one that would correspond to the darker and important part of the image. This current would then close the diaphragm control 5 too far by means of instrument 4, so that the important, darker parts of the subject would be underexposed on the film. On the other hand, the photocell 7 because of receiving light only from the darker parts of the subject has a high resistance and especially a considerably higher internal resistance than the photocell 8. Therefore according to this invention, since both photocells have the same polarity and are connected in series, the resulting flow of current is chiefly influenced by the internal resistance of the photocell 7 so that the effect of the bright parts is very slight only.

If for instance the ratio between the intensities of the dark and the light part of the subject is 1:10, whereby it is assumed that the upper part of the subject is light, the lower dark, the photocell 8 would supply a current which corresponds to an exposure value of 11, whereas the important dark part of the subject would require an exposure value of 9⅓. By connecting the photocell 8 with the photocell 7 according to the present invention, a current will flow which causes the indication of exposure value 9½, as has been proved by measurement. This means that the error was reduced from 1⅔ f-stops to only ⅙ f-stop. Such a deviation from the desired exposure is, however, negligible in practice, and satisfactory photos will result.

FIGURE 3 shows another embodiment of the invention.

Instead of the fixed photocell 7 mounted into the front part of the camera with the acceptance angle limiting device slanting downward, the upper photocell 11 is pivoted at its lower end and can be rotated around the axis 13 into the position A, B or C by means of the swivel lever 12. The electrical connection to the second photocell 14 is the same as shown in FIGURE 2. In the present instance also the acceptance angle limiting device of the photocell 11 is designed in such a way that the acceptance angle is symmetrical to the surface of the photocell.

When the photocell is in position A, the same effect is caused as described already for FIGURE 1. If, as an exception, the important part is to be found in the upper part of the subject, the photocell 11 is rotated into position C for the same purpose.

The whole arrangement can be made as follows to obtain an increase of sensitivity by which the threshold sensitivity is increased by the factor 2 to 4 when very low light intensities are prevailing, where the contrast range is mostly rather small:

When the photocell 11 is rotated into position B so that it is in the same plane as the photocell 14, both photocells are also connected electrically to be of the same polarity and in parallel. This connection is made by means of a switch 15 which is coupled to the rotary axis 13 of the photocell 11. In this case then when the photocells are in the same plane and also electrically in parallel, a known increase of sensitivity will result in the complete measuring and control system.

In the described embodiment photovoltaic cells were mentioned as light sensitive cells. The invention permits, of course, also the use of photo conductors, photo transistors and other light sensitive cells. The invention will also show the same effect when more than two light sensitive cells are used.

I claim:

1. For use with a camera, automatic photoelectric exposure apparatus comprising at least two light-sensitive cells, means for causing the light acceptance angle of one of said light-sensitive cells to differ from the light acceptance angle of the other light-sensitive cell, and means for varying the exposure of the film of said camera in response to the electrical current through said cells, said light-sensitive cells being series connected with said means for varying, one pole of one cell being connected to the opposite pole of said other cell in said series connection so that current is fed to said means for varying in inverse proportion to the combined impedances of said cells, whereby the exposure of the film is influenced primarily by the light-sensitive cell receiving the least amount of light.

2. Automatic photoelectric exposure apparatus according to claim 1, wherein said light acceptance limiting means comprises means pivotally mounting said one light-sensitive cell to change the light acceptance angle thereof.

3. Automatic photoelectric exposure apparatus according to claim 2, including means for connecting said cells in parallel in response to the adjustment of said one cell to a predetermined light acceptance angle.

References Cited in the file of this patent

UNITED STATES PATENTS

| | | |
|---|---|---|
| 2,378,433 | Riszdorfer | June 19, 1945 |
| 2,446,628 | Brown | Aug. 10, 1948 |
| 2,573,729 | Rath | Nov. 6, 1951 |
| 2,630,735 | Rouy | Mar. 10, 1953 |
| 2,776,364 | Daniels | Jan. 1, 1957 |
| 2,879,690 | Dunn | Mar. 31, 1959 |